United States Patent
Beyda

(10) Patent No.: US 7,533,166 B2
(45) Date of Patent: May 12, 2009

(54) METHOD AND SYSTEM FOR ROUTER MISCONFIGURATION AUTODETECTION

(75) Inventor: William J. Beyda, Cupertino, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 663 days.

(21) Appl. No.: 10/310,208

(22) Filed: Dec. 5, 2002

(65) Prior Publication Data

US 2004/0139179 A1 Jul. 15, 2004

(51) Int. Cl.
G06F 15/177 (2006.01)
G06F 15/173 (2006.01)

(52) U.S. Cl. .................. 709/224; 709/220; 709/221; 709/223; 709/242

(58) Field of Classification Search ......... 709/220–227, 709/238–244, 208, 210; 370/216, 218, 241, 370/242, 244; 714/4
See application file for complete search history.

(56) References Cited

U.S. PATENT DOCUMENTS

| | | | |
|---|---|---|---|
| 5,014,262 A * | 5/1991 | Harshavardhana | 370/237 |
| 5,307,354 A * | 4/1994 | Cramer et al. | 714/4 |
| 5,640,505 A * | 6/1997 | Hearn et al. | 379/114.01 |
| 5,708,654 A | 1/1998 | Arndt et al. | |
| 5,805,594 A * | 9/1998 | Kotchey et al. | 370/401 |
| 5,963,540 A * | 10/1999 | Bhaskaran | 370/218 |
| 6,131,120 A | 10/2000 | Reid | |
| 6,226,684 B1 | 5/2001 | Sung et al. | |
| 6,295,276 B1 | 9/2001 | Datta et al. | |
| 6,324,161 B1 * | 11/2001 | Kirch | 370/217 |
| 6,421,719 B1 * | 7/2002 | Lewis et al. | 709/224 |
| 6,574,669 B1 * | 6/2003 | Weaver | 709/239 |
| 6,625,659 B1 * | 9/2003 | Aramizu et al. | 709/221 |
| 6,754,220 B1 * | 6/2004 | Lamberton et al. | 370/401 |
| 6,925,054 B1 * | 8/2005 | Atterton et al. | 370/218 |
| 2002/0004843 A1 * | 1/2002 | Andersson et al. | 709/238 |
| 2002/0157018 A1 * | 10/2002 | Syvanne | 713/200 |
| 2003/0061318 A1 * | 3/2003 | Abdelhadi et al. | 709/221 |
| 2003/0133451 A1 * | 7/2003 | Mahalingaiah | 370/389 |

OTHER PUBLICATIONS

F. Kastenholz,. SNMP Communications Services. RFC 1270. Oct. 1991.*
C.L. Hedrick, "'An Introduction to IGRP,'" Technical Report, The State University of New Jersey, Center for Computers and Information Services, Aug. 22, 1991.*

* cited by examiner

Primary Examiner—Salad Abdullahi
Assistant Examiner—Brendan Y Higa

(57) ABSTRACT

Reconfiguration operations in a networking environment are actively monitored to automatically detect faulty network traffic routing conditions, such as routing loop. The autodetection includes identifying a condition in which one of a number of routers is switched to a reconfiguration mode. In response, a network monitoring state is initiated in which operational parameters of each router are recurringly analyzed to detect an unexpected deviation that evidences the faulty network traffic condition.

15 Claims, 4 Drawing Sheets

METHOD AND SYSTEM FOR ROUTER MISCONFIGURATION AUTODETECTION

BACKGROUND OF THE INVENTION

The invention relates generally to methods and systems for monitoring router reconfigurations and more particularly to reducing the likelihood of faulty network conditions as a result of router reconfigurations.

Within a large enterprise, such as a university or a major corporation, there may be a large number and a variety of types of devices that are supported by a segmented network. Network devices include personal computers, Internet Protocol (IP) telephones, servers, and printers. The segmentation of the network may be referred to as a Wide Area Network (WAN) or a Local Area Network (LAN) that is divided into subnetworks. Each subnetwork of a WAN or a LAN may be assigned one or more routers. Routers allow a WAN or LAN to be divided, so as to maintain data security for different divisions of an enterprise, while still enabling division-to-division intercommunications.

A router is a network component having at least two Network Interface Cards (NICs) that are compatible with a particular protocol, such as Internet Protocol (IP). Upon receiving a data packet, a router will determine the next hop the data packet must take in order to reach the destination device indicated by the destination address of the packet. Packets may be forwarded from one router to the next until the final router which supports the destination device is reached.

A router maintains a router table of addresses, such as IP addresses. Within the router table, each IP address is associated with a network interface that is to be used in forwarding packets having that address. However, routing loops occur when router tables are misconfigured. When another router or another router-to-router link is added to a network, router tables must be updated. The reconfiguration of the table may be performed manually. When a router table is inadvertently misconfigured, a loop in the network may result, so that a data packet will be continuously recycled between two or more routers. The data packet will continue to propagate through the network until a Time-to-Live (TTL) counter is exceeded, at least in the case of IP data packets. The continuous recycling of the misrouted packets can significantly reduce a data network's bandwidth. In some circumstances, the bandwidth may be so taxed as to cause a switch or a router to "crash." For some enterprises, the network is used to carry Telephony-over-LAN (ToL) voice information, so that a routing loop may cause disruption to the telephone service of the enterprise.

Routers of an enterprise routinely update each other, so that a misconfiguration of one router may be propagated to other routers in the network. As a consequence, reversing the changes throughout the network may take a significant period of time.

What is needed is a method and system for reducing the susceptibility of a network to faulty routing conditions as a result of router reconfigurations.

SUMMARY OF THE INVENTION

According to a specific embodiment, the present invention provides a method of controlling reconfiguration operations in a networking environment having a plurality of routers. The method includes identifying a condition in which one of the routers is switched to a reconfiguration mode; and initiating a network monitoring state that includes monitoring operational parameters of each router as an automated response to the identifying condition, where the operational parameters are indicative of network traffic routing conditions within the networking environment. The method also includes detecting faulty network traffic routing conditions on a basis of monitoring of the operational parameters; resetting the routers to configurations that preceded the network monitoring state as an automated response to detecting the faulty network traffic routing conditions; and enabling router reconfigurations if no faulty network traffic routing condition is detected.

According to another embodiment, the invention provides a method of controlling router table reconfigurations in a network environment. The method includes triggering a locked mode at second devices having routing tables in response to a first device having a particular routing table entering a reconfiguration mode for changing the particular routing table; and analyzing reports generated by the first and second devices while in the locked and reconfiguration modes, where the reports include information relevant to detecting a routing loop as an automated response to each report that is indicative of proper network operating conditions. The method also includes transmitting a message to the first or second device at which the report was generated, where the message provides clearance to continue operations; and using continuity between generating the reports and the messages as a condition for implementing reconfigurations of the particular routing table entered while the first device is in the reconfiguration mode.

According to another embodiment, the invention provides a system for monitoring router reconfigurations in a network having a plurality of routers. The system includes a reconfiguration controller enabled to identify a condition in which one of the routers is switched to a reconfiguration mode for affecting network trafficking. The reconfiguration controller is responsive to the identifying of the condition to initiate a network monitoring state in which each router periodically transmits a report indicative of operational parameters at the router. The system also includes a report analyzer for receiving reports from the routers and detecting faulty network routing conditions on a basis of the operational parameters; and a messaging unit cooperative with the report analyzer to send messages to the routers in response to receiving reports for which no faulty network routing condition is detected. The routers are enabled to revert to configurations preceding the switch to the reconfiguration mode in response to an absence of receiving one of the messages.

These and other embodiments are described in more detail below in conjunction with the following drawings.

DETAILED DESCRIPTION OF SPECIFIC EMBODIMENTS

Figure 1:
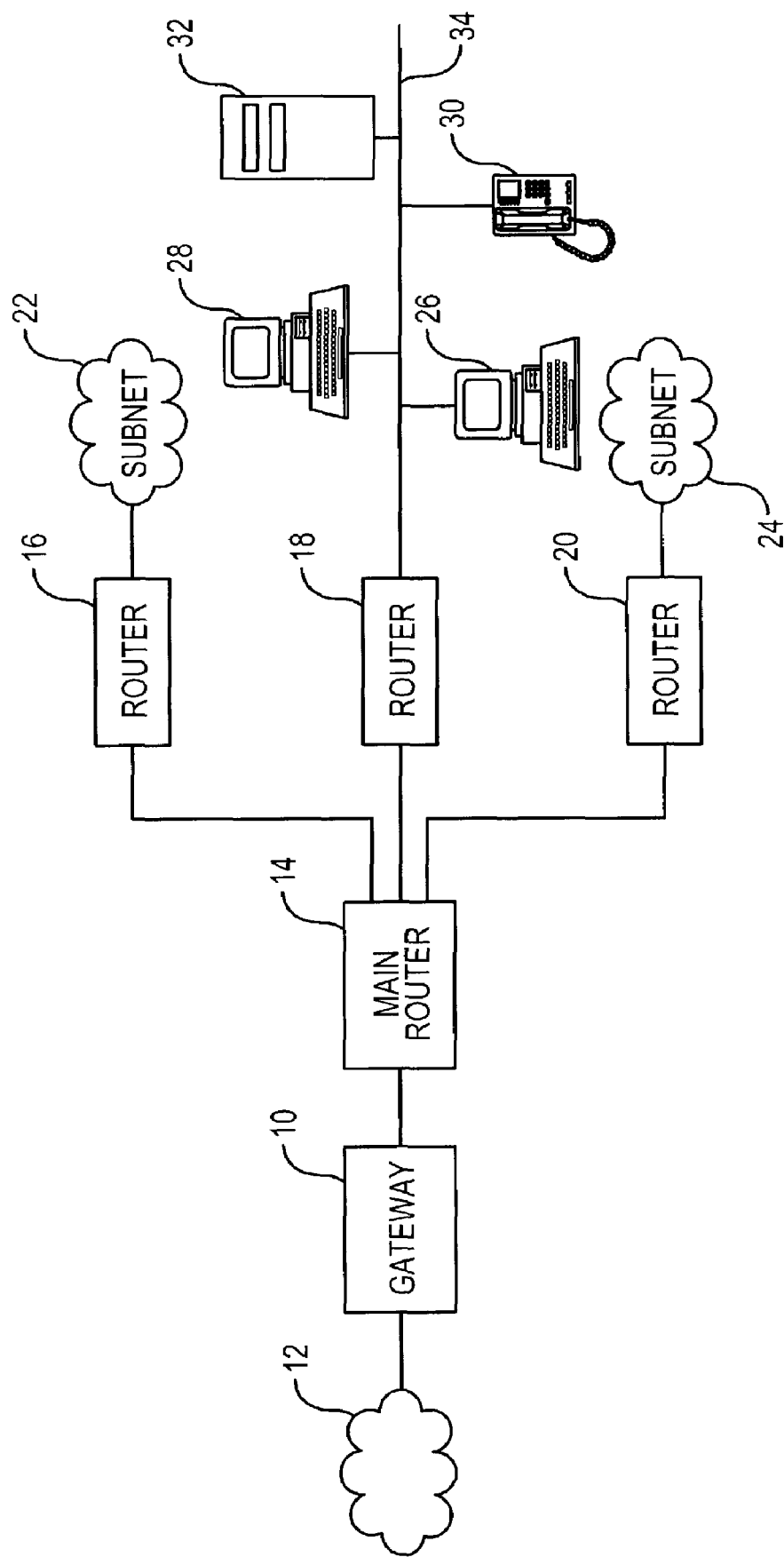
FIG. 1 is one possible network topology for utilizing the claimed invention.

A method of controlling reconfiguration operations in a networking environment, such as a WAN or LAN, having a number of routers includes enabling autodetection of faulty traffic routing conditions, such as routing loop. The autodetection includes identifying a condition in which one of the routers is switched to a reconfiguration mode. In response, a network monitoring state is initiated. In this state, the operational parameters of each router are actively monitored for the purpose of detecting faulty network traffic conditions. Useful operational parameters for a particular router include the current percentage of bandwidth utilization and the number of packets processed per second.

In one application of the invention, the network monitoring is performed at a central site, such as a main router of the network. When one of the routers enters a reconfiguration mode, the remaining routers are alerted. Preferably, the remaining routers are placed in a locked mode in which the routers are prevented from being reconfigured, other than in response to the changes to the router originally placed in the reconfiguration mode. Each router generates reports that include the operational parameters relevant to the "health" of that router. At the central site, the reports are received and analyzed in order to detect whether a faulty traffic routing condition exists on the network. The analysis may be particularly directed toward detecting routing loop.

In response to detecting a faulty traffic routing condition, the routers are reset to the configurations that preceded the reconfiguration. That is, the method utilizes a configuration rollback function. When a router is switched to its reconfiguration mode or its locked mode, an automated response to the mode switch may be to store the current configuration. The invention is particularly well suited for monitoring reconfiguration of router tables, so that the temporary storage may be accomplished merely by recording the current router table configurations in flash memory or other memory that maintains the integrity of data if the router is rebooted.

The switch of a router to the reconfiguration mode may activate a watchdog timer at the central site. As a consequence, each router is responsible for generating a report at a specified frequency. The frequency is preferably adjustable. The reports must be generated for a selected period of time, e.g., 20 minutes, which is also adjustable. In one sequence of events, when a report is generated by a particular router, the router will subsequently receive a message that indicates that no faulty traffic routing condition has been detected, so that the router will continue to generate the reports and enable reconfigurations until the watchdog timer is deactivated. In this sequence, the continuity between generating the reports and receiving the messages is a condition for implementing reconfigurations of routing tables. Thus, if one of the reports is not generated for analysis or one of the messages is not received, the configuration rollback function will be triggered. On the other hand, if the continuity condition is satisfied throughout the selected time period, the watchdog timer will send a release command to each of the routers to release the routers from the locked mode, thereby returning the routers to their normal modes, but with the table reconfigurations.

With reference to FIG. 1, an example of a possible topology for using the present invention is partially shown. A gateway 10 resides between a network 12 and a main router 14. The network 12 may be the Public Switch Telephone Network (PSTN) or any other network that is used to provide communication between devices of an enterprise and external devices. Alternatively, the network 12 represents a WAN of an enterprise and the gateway links one LAN to the other LANs. The techniques to be described below regarding actively monitoring reconfiguration operations may be used in a wide variety of networking environments.

As is well known, the gateway provides protocol conversion functions for the devices supported by the main router 14. In the example of the network topology of FIG. 1, the main router is connected to three other routers 16, 18 and 20. In an IP networking environment, data packets that are directed to the main router 14 via the gateway 10 are forwarded to the appropriate routers on the basis of the IP addresses contained within the packets. In FIG. 1, the routers 16 and 20 are shown as being connected to subnetworks 22 and 24. However, the router 18 is illustrated as supporting four devices, which may be personal computers 26 and 28, telephones 30, and servers 32. The four devices merely represent a limited number of devices that are interconnected via a subnetwork 34. As used herein, a "subnetwork" includes but is not limited to a LAN of a WAN or portion of a LAN that is separately supported by a dedicated router. Within a subnetwork, devices may communicate directly, but communication with a device of another network or subnetwork requires cooperation with at least one router.

Figure 2:
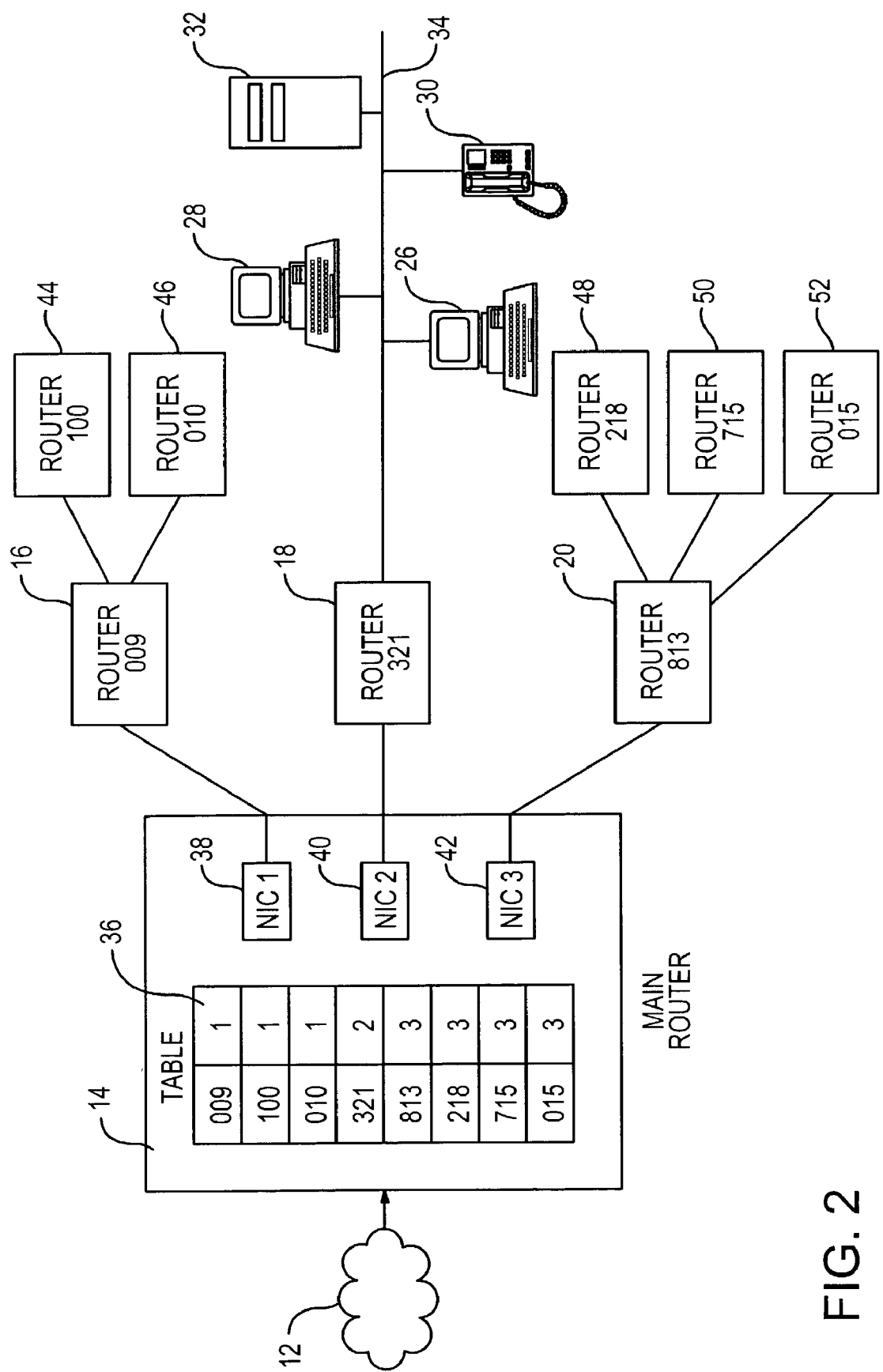
FIG. 2 is a block diagram of the cooperation of routers in a network such as the network of FIG. 1.

In FIG. 2, the main router 14 is shown as including a router table 36 and three Network Interface Cards (NICs) 38, 40 and 42. Each NIC represents input/output ports for forwarding and receiving data packets and communication-processing signals. The router table includes a first column of IP addresses (which are only partially represented in FIG. 2) and a second column that identifies the output port to which a packet is to be directed when the packet has the IP address of the first column. Comparing FIGS. 1 and 2, the subnetwork 22 of the router 16 is represented by a pair of routers 44 and 46 for supporting additional devices, such as telephones and personal computers. Similarly, the subnetwork 24 of the router 20 is represented by three routers 48, 50 and 52 that support additional devices, not shown. Each of the devices is assigned a separate IP address that is used by the main router 14 and any intervening routers to determine the direction that a data packet from the network 12 must take in order to reach the destination device.

Each of the routers 16, 18, 20, 44, 46, 48, 50 and 52 has a router table of the type shown in the main router 14. In a static networking environment, the router tables may be configured, tested and then fixed. However, it is common for a network to change in a manner that requires reconfigurations of the router tables. As one example, a router may be added to the network, requiring updates of the tables of previously existing routers if packets are to be forwarded to the added router. As another example, a link may be added to increase traffic efficiency or to increase network bandwidth. Because the various routers are in communication with each other, reconfigurations of one router are easily propagated to other routers, particularly the main router 14. Unfortunately, misconfigurations of router tables are also propagated. A misconfiguration can inadvertently cause a routing loop within the network. For example, a data packet that is targeted for the personal computer 28 and that was generated by a device supported by the router 44 may encounter a routing loop as it attempts to progress through the necessary routers. Misrouted packets can significantly reduce the available bandwidth of a network and even cause the network to be disabled, even when the life of data packets is limited by a Time-to-Live (TTL) counter. In the embodiment of FIGS. 1 and 2, the network supports telephony, so that the telephone service will also be disabled.

The invention utilizes autodetection of routing loops and other faulty conditions that are created by misconfigurations in networking environments that include routers. The autodetection of faulty conditions caused by misconfigurations may be performed at a central site or may be performed using distributed resources. In the embodiment to be described below, the autodetection occurs at a main site, such as the main router 14 of FIGS. 1 and 2. However, a separate device may be dedicated to the autodetection process.

Figure 3:
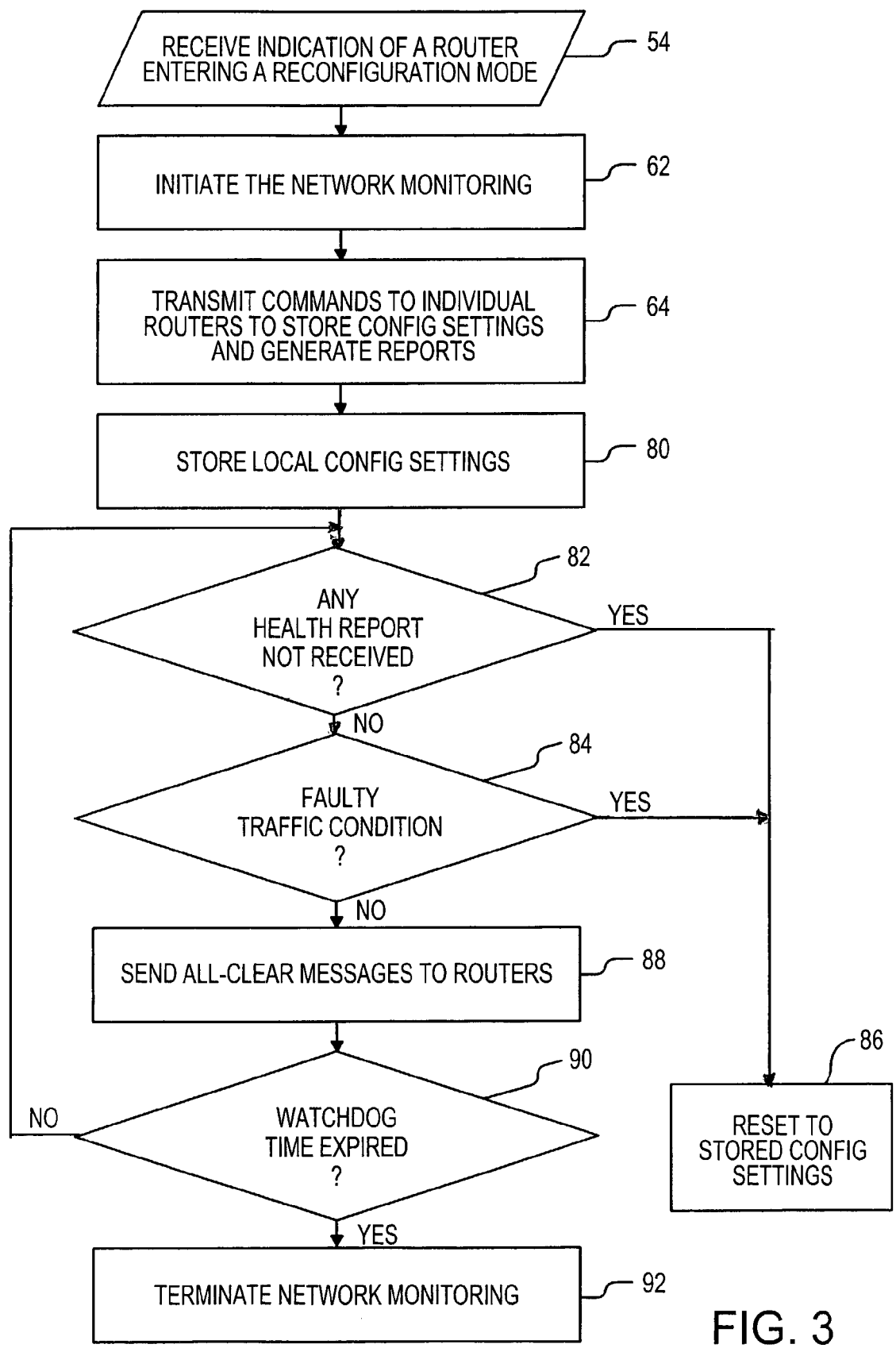
FIG. 3 is a process flow of steps for controlling reconfiguration operations in a networking environment, such as the network described with reference to FIGS. 1 and 2.
Figure 4:
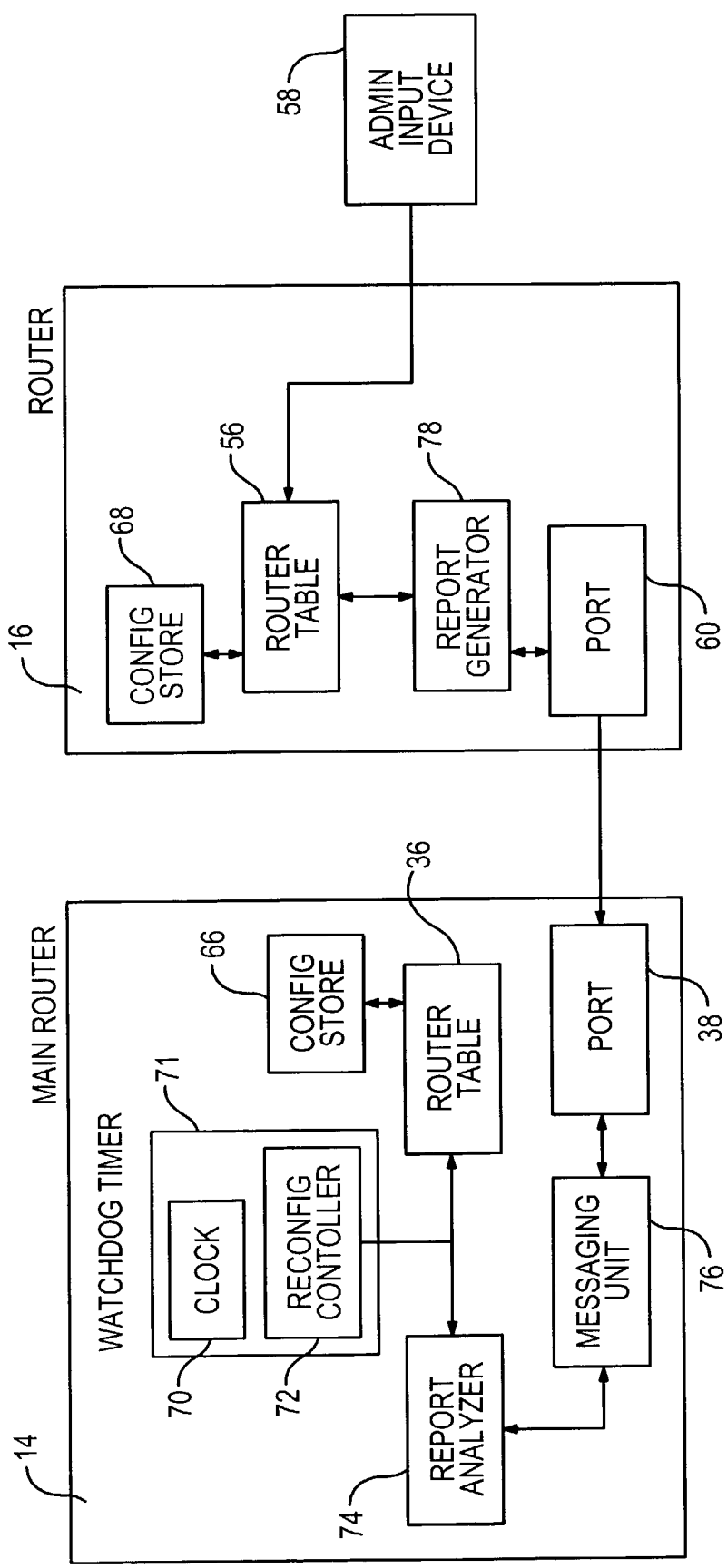
FIG. 4 is a block diagram of components of a monitoring router and a monitored router.

FIG. 3 illustrates one possible process flow of steps in accordance with the invention. At step 54, the main router 14 receives an indication that one of the other routers has entered a reconfiguration mode. In FIG. 4, the router 16 is used as the example in which a router table 56 is to be reconfigured. Router table reconfiguration is performed using known techniques and will not be described in detail herein. An administrator input device or devices 58 may be employed. The input device may be a computer keyboard, a computer mouse, or console controls on the face of the router. The mode change of the router 16 is communicated to the main router 14 via the ports 38 and 60 of the routers. The various routers may be programmed to communicate mode switches using specific messages, but this is not critical, since communications among the routers provide other means for detecting reconfigurations.

At step 62, network monitoring is initiated. For applications in which the autodetection is centrally executed, step 64 transmits commands to the individual routers to store reconfiguration settings and to periodically generate reports. Connected to the two router tables 36 and 56 of FIG. 4 are configuration stores 66 and 68, respectively. The configuration stores may be any type of memory, such as FlashROM or disk storage, that maintains the integrity of the stored data if the router were to "crash" and require a reboot process. The stored reconfiguration information is reinstated if certain traffic conditions are detected for certain router performance conditions (e.g., router crash).

As shown in FIG. 4, the main router includes a watchdog timer 71 having a clock 70 and a reconfiguration controller 72. The watchdog timer determines actions to be performed during the process. In the initiation of the network monitoring at step 62 and as a result of the transmission of the commands at step 64, each router of the network, other than the router 16 in the reconfiguration mode, is placed in a locked mode. In this locked mode, the current router tables are stored and the routers are prevented from entering a reconfiguration mode. Thus, any reconfiguration during the locked mode is the result of changes at the single router that is in the reconfiguration mode. Triggering the locked mode activates the watchdog timer, such that each router is set to periodically generate a report that includes operational parameters indicative of the "health" of the router. Useful operational parameters include the current percentage of bandwidth utilization and the number of packets processed per second. Both of these parameters are susceptible to a significant abrupt change when a routing loop occurs. The watchdog timer also determines the network monitoring state that is initiated at step 62. Merely as an example, the routers may be required to generate reports every 10 seconds or 60 seconds for a period of 10 minutes to one hour. The reconfiguration controller 72 may be adjusted to vary each of these two times.

The routers 16 include report generators 78 that are connected to the port 60 of the router. If the main router does not include the watchdog timer 71, it will also include a report generator, rather than a report analyzer 74 and a messaging unit 76.

Returning to the process of FIG. 3, in response to the commands that are transmitted at step 64, the routers will store their local configuration settings at step 80 and will begin generating the periodic health reports. In step 82, the health reports are received at the main router 14, which determines whether all of the expected reports for a given period have been received. If one or more of the routers has been disabled, or if the entire network has been disabled, less than all of the reports will be received. For occasions in which all expected reports are available to the main routers, in decision step 84, the main router determines whether there is a significant deviation in the health parameters of one or more of the routers. If a routing loop occurs, the health reports will deviate significantly and unexpectedly. As a consequence of an affirmative response at either the decision step 82 or the decision step 84, the stored local configuration settings will be reinstated at step 86. The mechanism for triggering the reversion to the original configuration settings will be described immediately below.

If the report analyzer 74 does not detect a faulty traffic condition at decision step 84, the messaging unit 76 will generate "all-clear" messages that are sent to the various routers at step 88. At a particular router 16, this provides continuity between the generating of reports and the receiving of all-clear messages. The actual content of the messages is not critical, since it is only necessary to link outgoing reports to incoming messages. At the central site (e.g., the main router) the required continuity is between receiving the full collection of expected health reports and conditionally transmitting the all-clear messages. If both continuities between reports and messages are maintained, the reconfiguration process continues until the time set by the watchdog timer expires. This is shown at decision step 90 in FIG. 3. The process will loop back to the step 82 of receiving health reports until the watchdog time has expired. Finally, at step 92, the network monitoring state is terminated.

It follows that if a faulty network traffic routing condition occurs, such as a routing loop, the all-clear messages will not be sent to the routers, causing the routers to reinstate the configuration settings that were stored when the routers were switched to the locked mode or the reconfiguration mode. Similarly, if the main router is unreachable because it is disabled or the network is disabled, the continuity between outgoing reports and incoming all-clear messages will be disrupted, causing the routers to return to their configuration settings that preceded the change in mode.

The advantage of the process that was described with reference to FIGS. 1-4 is that routing loops and similar faulty network traffic routing conditions are automatically detected. The active monitoring enables immediate self-healing of the routers. This eliminates the need for network administrators to reconfigure all affected routers after a misconfiguration of one router propagates through the network.

As previously mentioned, the active monitoring may take place in a device other than a router. Moreover, as used herein, a "router" includes any device or collection of devices that forwards communications on the basis of associating addresses with specific devices using a mechanism similar to a router table.

What is claimed is:

1. A method of controlling reconfiguration operations in a networking environment having a plurality of routers comprising:

identifying when one of said routers is switched to a reconfiguration mode when an indication is received from a first router entering a reconfiguration mode, said first router being switched to said reconfiguration mode following an addition of a second router to said networking environment, said reconfiguration mode adjusting a router table of said first router, said router table including a set of IP addresses and a set of output ports, each IP address corresponding with an output port for directing a packet;

locking other routers of said plurality of routers, said locking other routers of said plurality of routers preventing said other routers from entering a reconfiguration mode;

initiating a network monitoring state that includes monitoring operational parameters of each said router as an automated response to said identifying said reconfiguration mode of said first router, where said operation parameters are indicative of network traffic routing conditions within said network environment;

said initiating said network monitoring state includes:

activating a report requirement in which each said router transmits periodic reports to a central site, each said report including information specific to said operational parameters including current percentage of bandwidth utilization and a number of packets processed per second;

enabling router reconfigurations to be sustained beyond said network monitoring state only upon receiving authorization for said central site;

detecting faulty network traffic routing conditions on a basis of said monitoring of said operational parameters, said faulty network traffic routing conditions being based upon a change of percentage of bandwidth utilization and a number of packets processed per second;

resetting said first router to a configuration that preceded said network monitoring state as an automated response to said detecting said faulty network traffic routing conditions, said first router being reset when all-clear messages are not received by said other routers, said all-clear messages being indicative of no faulty network traffic condition; and enabling router reconfiguration of said first router if no said faulty network traffic routing condition is detected.

2. The method of claim 1 wherein said initiating said network monitoring state includes transmitting messages to said other routers to store current configuration settings, said current configuration settings for said other routers being reinstated as said automated response to said detecting said faulty network traffic muting conditions.

3. The method of claim 1 wherein said initiating said network monitoring state includes activating a watchdog timer at a central monitoring site, said watchdog timer being configured to maintain said network monitoring state for a specified time period.

4. The method of claim 1 wherein said initiating said network monitoring state includes requiring each said router to receive said all-clear message for each said periodic report, said detecting faulty network routing conditions being based on said information within said periodic reports.

5. The method of claim 1 further comprising analyzing each said periodic report at said central site to detect occurrences of router loop as a consequence of misconfiguration of at least one router table.

6. The method of claim 1 wherein said detecting Includes identifying router loop within said network environment, said operational parameters being indicative of current use of bandwidth.

7. A method of controlling router table reconfigurations in a network environment comprising:

receiving an indication from said first device when said first device enters a reconfiguration mode, said first device being switched to said reconfiguration mode following an addition of a second device to said networking environment, said reconfiguration mode adjusting a router table of said first device;

triggering a locked mode at second devices having routing tables in response to said first device having a particular routing table entering said reconfiguration mode for changing said particular routing table, said particular routing table including a set of IP addresses and a set of output ports, each IP address corresponding with an output port for directing a packet, said locked mode of said second devices preventing second devices from entering a routing table reconfiguration mode;

initiating a network monitoring state that includes monitoring operational parameters of each of said first and second devices as an automated response to receiving said indication from said first device when said first device enters said reconfiguration mode;

said initiating said network monitoring state includes:

analyzing, at a central site, reports generated by said first and second devices while in said locked and reconfiguration modes, said reports including information relevant to detecting a routing loop including current percentage of bandwidth utilization and a number of packets processed per second;

as an automated response to each said report that is indicative of proper network operating conditions, transmitting a message from said central site to said first or second device at which said report was generated, said message providing clearance to continue operations which indicates proper network operating conditions;

using continuity between generating said reports and said messages as a condition for implementing reconfigurations of said particular routing table entered while said first device is in said reconfiguration mode; and reverting each of said second devices to configurations that preceded said locked mode in response to a failure of receipt of said message providing clearance as an automated response.

8. The method of claim 7 wherein said triggering said locked mode includes activating a watchdog timer such that:

each said first and second device is set to generate one of said reports for each selected period of time;

each said report is transmitted to a central location at which said analyzing occurs;

said messages are transmitted from said central location, each said message having a correspondence with one of said reports; and said locked mode is automatically terminated upon expiration of a specified Ume period in which said continuity is uninterrupted.

9. The method of claim 8 wherein activating said watchdog timer includes using receptions of said reports in accordance with said selected period of time as a second condition for implementing said reconfigurations.

10. A system for monitoring router reconfigurations in a network having a plurality of routers comprising:

a reconfiguration controller enabled to identify a condition in which one of said routers is switched to a reconfiguration mode for affecting network trafficking, said condition being identified when an indication is received from a first router entering said reconfiguration mode, said first router being switched to said reconfiguration mode following an addition of a second router to said network, said reconfiguration controller triggering a locked mode at other routers in response to said first router being switched to said reconfiguration mode, said locked mode of other routers preventing said other routers from entering a reconfiguration mode, said reconfiguration mode adjusting a routing table, said routing table including a set of IP addresses and a set of output ports, each IP address corresponding with an output port for directing a packet, said reconfiguration controller being responsive to said identifying said condition to initiate a network monitoring state in which each said router periodically transmits a report indicative of operational parameters at said router;

a report analyzer for receiving said reports from said routers and detecting faulty network routing conditions on a basis of said operational parameters including current percentage of bandwidth utilization and a number of packets processed per second;

a messaging unit cooperative with said report analyzer to send messages to said other routers in response to receiving said reports for which no faulty network routing condition is detected; and wherein said other routers are released from locked mode and proceed with reconfiguration when said messages are received, said other routers remaining in locked mode upon failure to receive said messages.

11. The system of claim 10 wherein said report analyzer and said messaging unit are further cooperative to provide a one-to-one correspondence between said messages and said reports for which no faulty network routing condition is detected.

12. The system of claim 10 wherein said reconfiguration controller is a component of a watchdog timer enabled to determine a time during which said routers are to generate said reports, said time being adjustable via a user input device.

13. The system of claim 12 wherein said reconfiguration controller is further enabled to determine a frequency of said generating said reports by each said router, said frequency being adjustable via said user input device.

14. The system of claim 10 wherein said messages are all-clear messages which enable implementation of reconfigurations of said one router switched to said reconfiguration mode.

15. The system of claim 14 wherein said reconfiguration controller is responsive to said rower switching to said reconfiguration mode for entering changes to a router table, said reconfiguration mode being set to prevent two said routers from simultaneously and non-cooperatively being in said reconfiguration mode.

* * * * *